United States Patent
Liu et al.

(10) Patent No.: US 8,901,826 B2
(45) Date of Patent: Dec. 2, 2014

(54) LIGHT SENSING MODULE AND CALIBRATION METHOD FOR DRIVING CURRENT OF LIGHT SOURCE

(75) Inventors: Han-Chi Liu, Hsinchu (TW); Hsin-Chia Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 193 days.

(21) Appl. No.: 13/568,000

(22) Filed: Aug. 6, 2012

(65) Prior Publication Data

US 2013/0181610 A1      Jul. 18, 2013

(30) Foreign Application Priority Data

Jan. 18, 2012   (TW) .............................. 101102033 A

(51) Int. Cl.
*H05B 37/02*        (2006.01)

(52) U.S. Cl.
USPC ......................................................... 315/149

(58) Field of Classification Search
None
See application file for complete search history.

(56) References Cited

U.S. PATENT DOCUMENTS

2009/0140984 A1*   6/2009   Soo et al. ...................... 345/166

* cited by examiner

*Primary Examiner* — Jany Richardson
(74) *Attorney, Agent, or Firm* — Cheng-Ju Chiang

(57) ABSTRACT

A calibration method for a driving current of a light source adapted to sequentially calibrate at least an optical navigation device, each including a light sensing device, a memory unit and a driving unit. The driving unit is electrically connected to the memory unit and a light source configured to receive a reflection light. The calibration method includes steps of: driving the light source to provide a beam through configuring the driving unit to supply a first driving current to the light source; configuring the light sensing device to generate a sensed light value; obtaining a second driving current through modulating the value of the first driving current according to the sensed light value; and recording the value of the second driving current in the memory unit and driving the light source to provide the beam according to the second driving current. A light sensing module is also provided.

13 Claims, 3 Drawing Sheets

LIGHT SENSING MODULE AND CALIBRATION METHOD FOR DRIVING CURRENT OF LIGHT SOURCE

TECHNICAL FIELD

The present invention relates to a calibration method, and more particularly to a calibration method for a driving current of a light source and a light sensing module to which the calibration method can be applied.

BACKGROUND

The main function of an optical navigation device is to control a movement of a cursor on a screen of an electronic device so as to realize an operation of the electronic device. Optical finger mouse and optical mouse are the two most common optical navigation devices in present; wherein optical mouse is specifically adapted to be used on a work surface.

Basically, the realization of optical navigation device is based on a position variation of beams sensed by a light sensing device thereof to calculate the direction and distance the cursor needing to move. The aforementioned beams are emitted from a light source and then through a direction of some optical components (for example, lens, reflective surface, etc.) in the optical navigation device to be emitted onto the light sensing device.

However, because each individual optical navigation device may have a light source having a different luminous efficiency or may be affected by the optical components therein thereby further resulting in a different light loss, the beams to be sensed by the light sensing device in each individual optical navigation device may not always can have a standard intensity. Thus, if the optical navigation device cannot configure its light source to emit beams with a proper intensity, the light sensing device may not accurately or successfully sense the beams and consequently the optical navigation device may have a low production yield if the beams have a relatively large or small intensity.

SUMMARY OF EMBODIMENTS

Therefore, one object of the present invention is to provide calibration method so as to improve an associated optical navigation device's production yield.

Another object of the present invention is to provide a light sensing module having a memory unit stored with a driving current value; accordingly an associated optical navigation device can have an improved production yield.

The present invention provides a calibration method for a driving current of a light source. The calibration method is adapted to sequentially calibrate at least an optical navigation device. Each optical navigation device includes a light sensing device, a memory unit and a driving unit. The driving unit is electrically connected to the memory unit and a light source. The light sensing device is configured to receive a reflection light. The calibration method is used for pre-calibrating the driving current of the light source of each optical navigation device before the optical navigation device is being used. The calibration method includes steps of: driving the light source to provide a beam through configuring the driving unit to supply a first driving current to the light source; configuring the light sensing device to generate a sensed light value, wherein the sensed light value is related to the reflection light, and the reflection light is derived from the beam after being reflected by a standard test surface of a test device; obtaining a second driving current through modulating the value of the first driving current according to the sensed light value; and recording the value of the second driving current in the memory unit and driving the light source to provide the beam according to the second driving current.

In an embodiment of the present invention, the sensed light value is related to an intensity of the reflection light, and the aforementioned calibration method further includes a step of: calibrating the intensity of the beam to a standard value.

In an embodiment of the present invention, the standard test surface has a pattern.

In an embodiment of the present invention, the reflectance of the standard test surface to the beam is configured to be in a range between 10%~70%.

In an embodiment of the present invention, the aforementioned calibration method further includes a step of: modulating, while the light source is not being supplied with the driving current, a sensed value offset of the light sensing device according to a sensed light value generated by the light sensing device.

In an embodiment of the present invention, the aforementioned calibration method further includes steps of: supplying a third driving current to drive the light source to emit a beam; and modulating the sensed value offset of the light sensing device according to the reflection light emitted thereon.

In an embodiment of the present invention, the beam generated by the third driving current has a micro intensity.

The present invention further provides a light sensing module, which includes a light sensing device, a memory unit and a driving unit. The light sensing device is configured to receive a reflection light and accordingly generate a sensed light value. The sensed light value is related to an intensity of the reflection light. The reflection light is derived from a beam reflected by a standard test surface of a test device. The memory unit is stored with a driving current value. The driving current value is related to the sensed light value. The driving unit is electrically connected to the memory unit and the light sensing device and configured to generate a driving current according to the driving current value thereby resulting in the sensed light value located in a standard region. The light sensing device, the memory unit and the driving unit are packages as a whole.

In an embodiment of the present invention, the memory unit is a non-volatile memory.

In an embodiment of the present invention, the aforementioned light sensing module further includes a light source configured to emit the beams according to driving current.

In an embodiment of the present invention, the light source and the light sensing device are disposed in two different accommodation spaces.

In an embodiment of the present invention, the accommodation space disposed with the light source is configured to have an opening with a size larger than that of the light source.

In an embodiment of the present invention, the light source and the light sensing device are disposed in a same accommodation space and configured to have a blocking part therebetween.

To sum up, in the calibration method for a driving current of a light source according to the present invention, the beams to be sensed by a light sensing device firstly are calibrated, through supplying a proper driving current to a light source based on a sensed light value which is generated by the light sensing device, to have an intensity within a standard range. Thus, the calibration method facilitates the light sensing device to have a higher sensing accuracy and consequently the optical navigation device adopting this light sensing device can have an improved production yield. Moreover, in the light sensing module according to the present invention, a memory unit is stored with a driving current value and a driving unit can drive a light source to emit beams directly based on the driving current value stored in the memory unit. Therefore, the beams emitted from the light source and to be sensed by the light sensing device are calibrated to have intensity within a standard range. Thus, the light sensing device facilitates to have a higher sensing accuracy and consequently the optical navigation device adopting this light sensing device can have an improved production yield.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
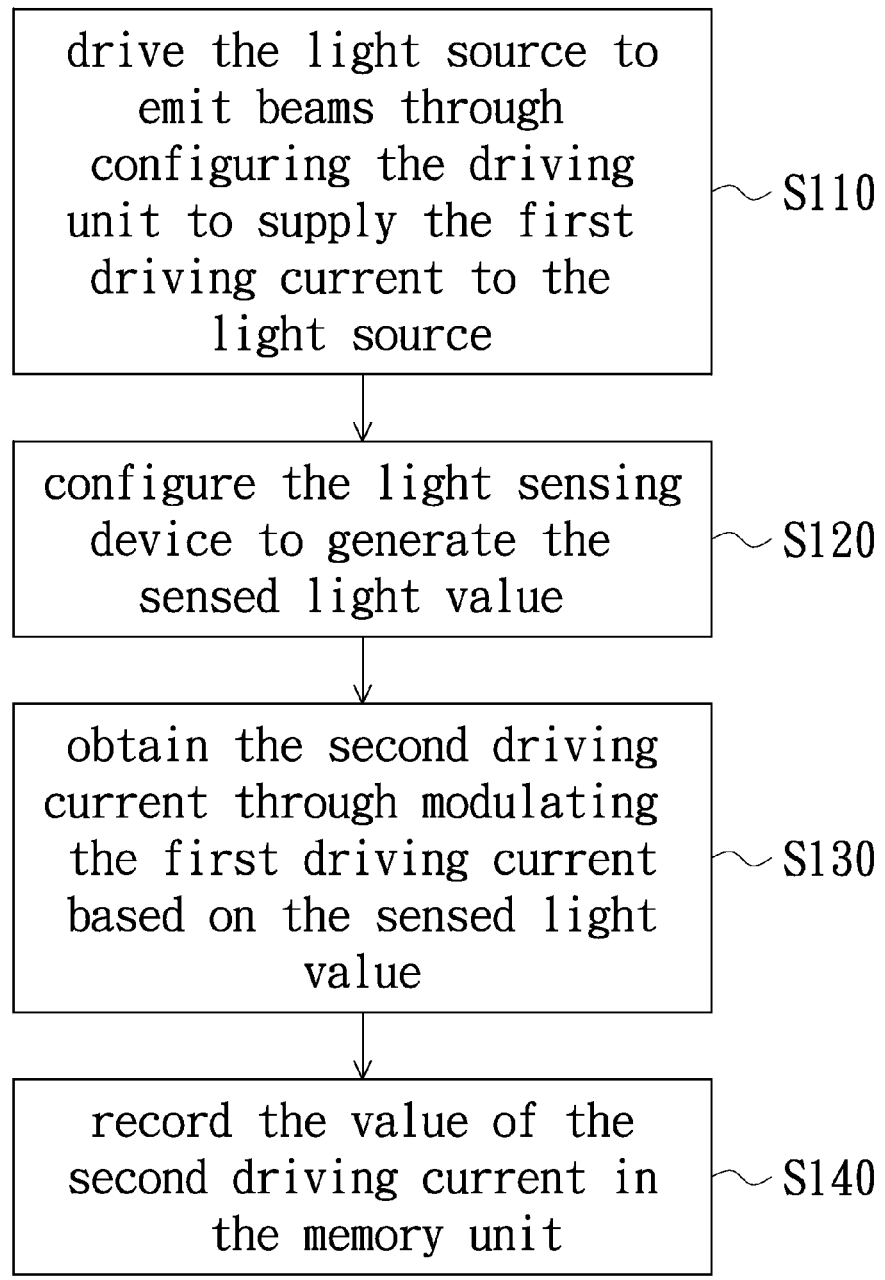
FIG. 1 is a flow chart illustrating a calibration method for a driving current of a light source in accordance with an embodiment of the present invention.
Figure 2:
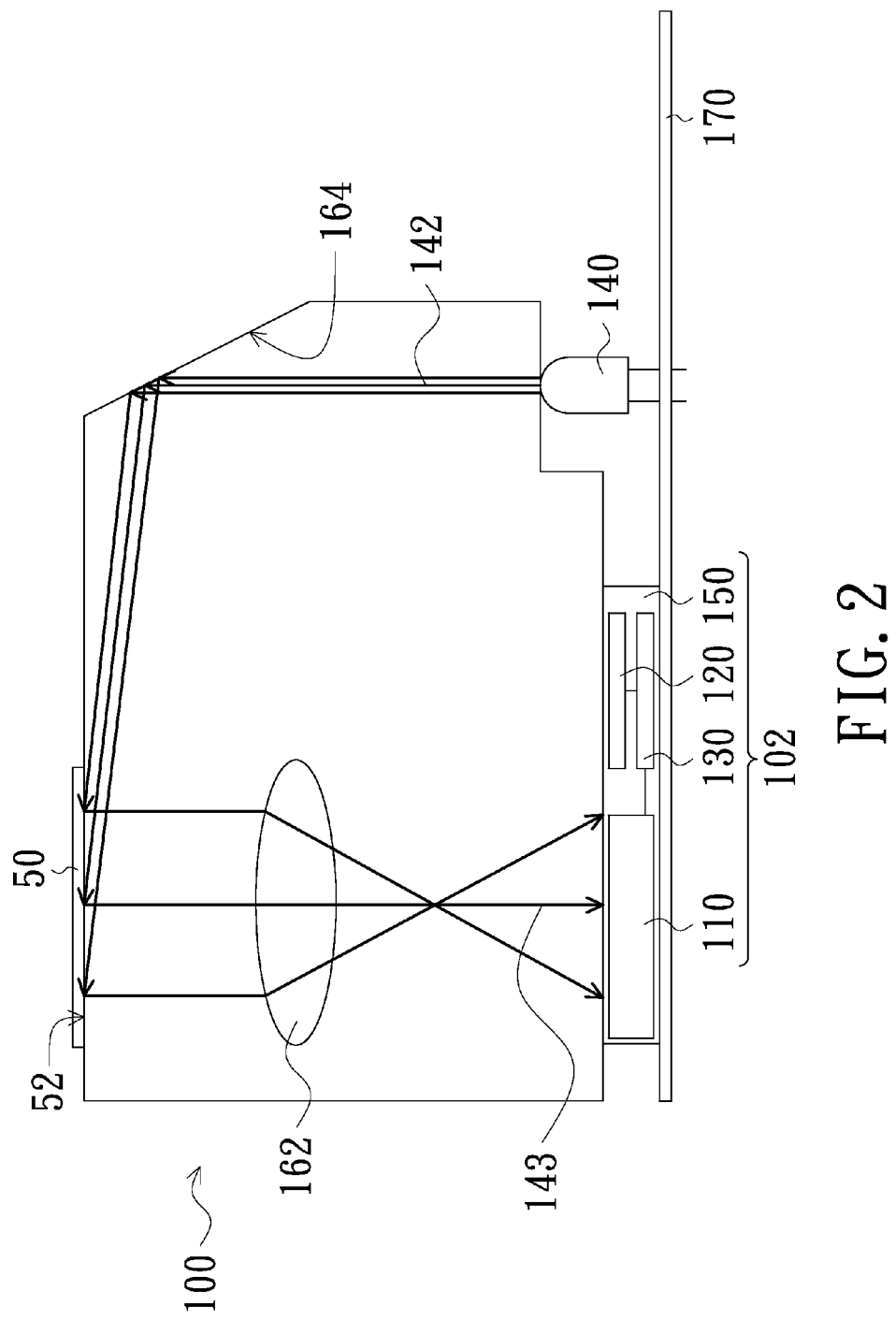
FIG. 2 is a schematic view of an optical navigation device in accordance with an embodiment of the present invention associated with the calibration method in FIG. 1.

FIG. 1 is a flow chart illustrating a calibration method for a driving current of a light source in accordance with an embodiment of the present invention. FIG. 2 is a schematic view of an optical navigation device in accordance with an embodiment of the present invention associated with the calibration method in FIG. 1; wherein the calibration method illustrated in FIG. 1 is adapted to sequentially calibrate at least one optical navigation device 100 in FIG. 2. Please refer to FIGS. 1, 2 both. Each optical navigation device 100 includes a light sensing device 110, a memory unit 120 and a driving unit 130. The driving unit 130 is electrically connected to the light sensing device 110, the memory unit 120 and a light source 140. The light sensing device 110 is, with no limitation, an image sensing device which is, for example, implemented by a Charged Coupled Device (CCD) or a Complementary Metal-Oxide-Semiconductor Transistor (CMOS) and configured to receive reflection lights 143. The light source 140 is a light emitting diode or other types of light source that can have specific light emitting characteristics through being supplied with different driving currents.

The calibration method is used to pre-calibrate the driving current of the light source 140 before the light sensing device 110 is being used so as to improve the sensing accuracy thereof.

The calibration method includes the following steps. Firstly, the driving unit 130 supplies a first driving current to the light source 140 so as to drive the light source 140 to emit beams 142 (step S110).

Next, the light sensing device 110 generates, according to the reflection lights 143, a sensed light value (step S120); wherein the reflection lights 143 are derived from beams 142 after being reflected by a standard test surface 52 of a test device 50. In other words, through sensing the reflection lights 143, the light sensing device 110 can obtain specific optical information (for example, the aforementioned sensed light value) of the reflection lights 143. In addition, a test device 50 (for example, a tool or a device) is provided to calibrate each individual optical navigation device 100. The test device 50 has standard test surface 52, on which a specific patterns is formed. In particular, the patterns are configured to be similar to fingerprints if the to-be-calibrated optical navigation device 100 is an optical finger mouse; and thus, the reflectance of the standard test surface 52 to beams 142 is configured to be similar to that of a finger to beams 142 so as to simulate that beams 142 are being reflected by a finger. Specifically, the reflectance of the standard test surface 52 to beams 142 is configured to be in a range between 10%~70%.

Then, a second driving current is generated according to a calibration of the value of the first driving current (step S130). For example, in the embodiment that the sensed light value is related to the intensity of the reflection lights 143, the calibration method further includes a step of calibrating the intensity of beams 142 to a standard value. That is, the luminous intensity of the light source 140 is kept being modulated by calibrating the value of the first driving current until the intensity of the reflection lights 143 received by the light sensing device 110 is located within a standard range. At this time, the modulated driving current being supplied to the light source 140 is referred to as the second driving current. In other words, the second driving current can drive the light source 140 to emit beams 142 with a standard-valued intensity.

Afterwards, the value of the second driving current is recorded in the memory unit 120 (step S140). Thus, the light sensing device 110 can preferably sense the beams 142 corresponding to the second driving current. In other words, the driving unit 130 can drive, according to the value of the second driving current recorded in the memory unit 120, the light source 140 to emit beams 142 having an intensity corresponding to the value of the second driving current. Thus, the beams (or, the reflection lights 143) to be sensed by light sensing device 110 can have an intensity located in a preferred range; consequently the light sensing device 100 can have an improved sensing accuracy.

The calibration method of the present embodiment is performed in a testing procedure for each individual optical navigation device 100 after being manufactured. Therefore, even these optical navigation devices 100 each may have a light source 140 with a different emission efficiency or may have different light loss caused by some optical components (for example, a lens 162, a reflective surface 164, etc) therein, these optical navigation devices 100 each still can have its light sensing device 110 to generate a sensed light value located within a preferred range through the aforementioned calibration method. Thus, the calibration method facilitates the light sensing device 110 to have a higher sensing accuracy and consequently the optical navigation device 100 can have an improved production yield.

It is to be noted that, the calibration method according to this embodiment may further include a step of performing a calibration on a sensed value of the light sensing device 110. In this step, specifically, a calibration is performed on a sensed value offset, which is generated by the light sensing device 110 while the light source 140 is not supplied with a driving current, according to the sensed light value and thereby facilitating the sensed light value of the light sensing device 110 to be located within a predetermined range while the light source 140 is configured to not emit beams 142.

In another embodiment, the step for performing a calibration on a sensed value of the light sensing device 110 can be realized by: firstly supplying a third driving current to the light source 140 so as to emit beams 142; and then modulating the sensed value offset of the light sensing device 110 according to the reflection lights 143 received by the light sensing device 110, and thereby facilitating the sensed value of the light sensing device 110 to be located within a predetermined range. In other words, firstly the light source 140 is configured to emit beams 142, which have a micro intensity and function as modulation beams; and then the sensed value of the light sensing device 110 is calibrated according to the reflection lights 143 received by the light sensing device 110.

In addition, the light sensing device 110, the memory unit 120 and the driving unit 130 each are an integral component of the light sensing module 102, and the light sensing 110, the memory unit 120 and the driving unit 130 can be, for example, packaged as a whole. That is, the light sensing module 102 can further include a coating part 150, in which the light sensing device 110, the memory unit 120 and the driving unit 130 are coated. The coating part 150 is a packaging adhesive or a hollow-shell structure. The coating part 150 has an opening (not shown) configured to expose the light sensing device 110 from the coating part 150, and accordingly the light sensing device 110 can receive the reflection lights 143 through the opening. In addition, the light sensing module 102 and the light source 140 are, for example, disposed on a circuit board 170, and the driving unit 130 of the light sensing module 102 is, for example, electrically connected to the light source 140 through the circuit board 170.

The memory unit 120 is configured to store a value of a driving current. The driving unit 130 is electrically connected to the memory unit 120 and the light sensing device 110. The light sensing device 110 is configured to receive the reflection lights 143 and accordingly generate the sensed light value; wherein the sensed light value is related to the generation of the driving current value stored in the memory unit 120. The driving unit 130 is configured to generate a driving current to drive the light source 140 according to the driving current value. Thus, even these optical navigation devices 100 each may have a light source 140 with a different emission efficiency or may be affected by some optical components therein, these optical navigation devices 100 each still can, due to each is driven by an associated calibrated driving current according to the driving current value stored in the memory unit 120, have its light sensing module 102 to generate a qualified sensed light value; consequently these optical navigation devices 100 each can have a qualified quality. Herein, it is to be noted that the qualified sensed light value means that the sensed light value is located within a standard range; in other words, these light sensing module 102 each generate a sensed light value located within a standard range.

In one embodiment, the memory unit 120 is a non-volatile memory, such as an electronic fuse memory, one time program memory, erasable programmable read only memory (EPROM), flash memory, electrically-erasable programmable read-only memory, or other types of non-volatile memory. In another embodiment, the memory unit 120 is a volatile memory and accordingly is needed to be powered by an electrical power device (for example, a battery).

As shown in FIG. 2, the memory unit 120 is exemplified by an individual component. However, it is understood that the memory unit 120 can be integrated into either the light sensing device 110 or the driving unit 130 in some other embodiments.

Figure 3:
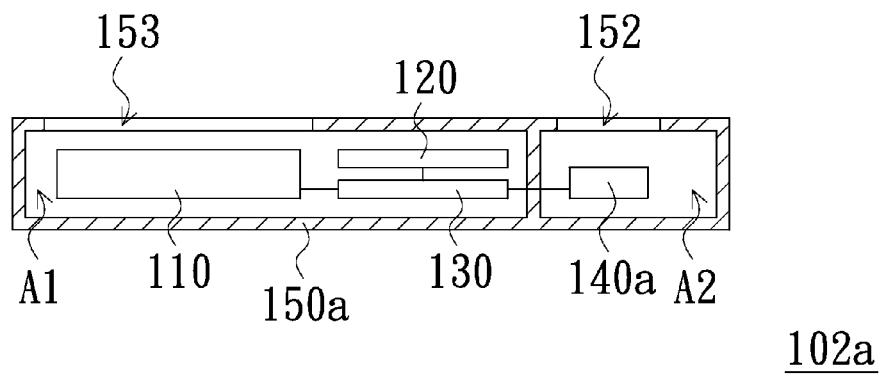
FIG. 3 is a schematic cross-sectional view of a light sensing module in accordance with another embodiment of the present invention.

FIG. 3 is a schematic cross-sectional view of a light sensing module in accordance with another embodiment of the present invention. As shown, the light sensing module 102*a* in this embodiment is similar to the aforementioned light sensing module 102 shown in FIG. 2, and the main difference between the two is that a light source 140*a* is included in the light sensing module 102*a*; wherein the light source 140*a* is configured to emit beams according to a supplied driving current. The light source 140*a* and the light sensing device 110 are respectively disposed in two different accommodation spaces. As shown in FIG. 3, two accommodation spaces A1, A2 are defined by a coating part 150*a* of the light sensing module 102*a*; wherein the light sensing device 110 is disposed in the accommodation space A1 and the light source 140*a* is disposed in the accommodation space A2. In addition, the accommodation space A2 is defined with an opening 152, which has a size larger than the light source 140*a*, so the beams emitted from the light source 140*a* can pass through the opening 152 more efficiently. The beams to be received by the light sensing device 110 are, for example, emitted into the coating part 150*a* through an opening 153 thereof. In addition, the light sensing module 102*a* in this embodiment can be used to replace the light sensing module 102 and the light source 140 both in FIG. 2.

Figure 4:
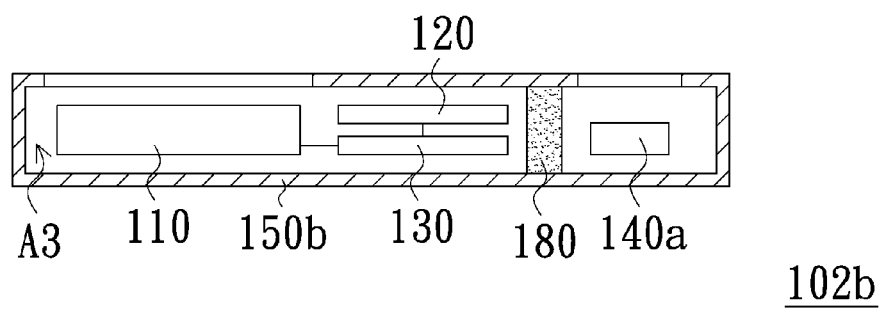
FIG. 4 is a schematic cross-sectional view of a light sensing module in accordance with still another embodiment of the present invention.

FIG. 4 is a schematic cross-sectional view of a light sensing module in accordance with still another embodiment of the present invention. As shown, the light sensing module 102*b* in this embodiment is similar to the aforementioned light sensing module 102*a* shown in FIG. 3; and the main difference between the two is that only one accommodation space A3 is defined by a coating part 150*b* of the light sensing module 102*b*; wherein the light source 140*a* and the light sensing device 110 both are disposed in the accommodation space A3. A blocking part 180 is formed between the light source 140*a* and the light sensing device 110 so as to prevent the light sensing device 110 from receiving stray lights in the accommodation space A3 and directly emitted from the light source 140*a*. The blocking part 180 and the coating part 150*b* are two different components, and it is not necessary to configure the blocking part 180 to have materials same as the coating part 150*b* has. In addition, the light sensing module 102*b* in this embodiment can be used to replace the light sensing module 102 and the light source 140 both in FIG. 2.

Therefore, the present invention can be summarized to have at least the following advantages.

1. In the calibration method for a driving current of a light source according to the present invention, the beams to be sensed by a light sensing device firstly are calibrated, through supplying a proper driving current to a light source based on a sensed light value which is generated by the light sensing device, to have an intensity within a standard range. Thus, the calibration method facilitates the light sensing device to have a higher sensing accuracy and consequently the optical navigation device adopting this light sensing device can have an improved production yield.

2. In the light sensing module according to the present invention, a memory unit is stored with a driving current value and a driving unit can drive a light source to emit beams directly based on the driving current value stored in the memory unit. Therefore, the beams emitted from the light source and to be sensed by the light sensing device are calibrated to have intensity within a standard range. Thus, the light sensing device facilitates to have a higher sensing accuracy and consequently the optical navigation device adopting this light sensing device can have an improved production yield.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A calibration method for a driving current of a light source, the calibration method being adapted to sequentially calibrate at least an optical navigation device, each optical navigation device comprising a light sensing device, a memory unit and a driving unit, the driving unit being electrically connected to the memory unit and a light source, the light sensing device being configured to receive a reflection light, the calibration method being used for pre-calibrating the driving current of the light source of each optical navigation device before the optical navigation device is being used, the calibration method comprising steps of:
   driving the light source to provide a beam through configuring the driving unit to supply a first driving current to the light source;
   configuring the light sensing device to generate a sensed light value, wherein the sensed light value is related to the reflection light, and the reflection light is derived from the beam after being reflected by a standard test surface of a test device;
   obtaining a second driving current through modulating the value of the first driving current according to the sensed light value; and
   recording the value of the second driving current in the memory unit and driving the light source to provide the beam according to the second driving current.

2. The calibration method according to claim 1, wherein the sensed light value is related to an intensity of the reflection light, and the calibration method further comprises a step of:
   calibrating the intensity of the beam to a standard value.

3. The calibration method according to claim 1, wherein the standard test surface has a pattern.

4. The calibration method according to claim 1, wherein the reflectance of the standard test surface to the beam is configured to be in a range between 10%~70%.

5. The calibration method according to claim 1, further comprising a step of:
   modulating, while the light source is not being supplied with the driving current, a sensed value offset of the light sensing device according to a sensed light value generated by the light sensing device.

6. The calibration method according to claim 1, further comprising steps of:
   supplying a third driving current to drive the light source to emit a beam; and
   modulating the sensed value offset of the light sensing device according to the reflection light emitted thereon.

7. The calibration method according to claim 6, wherein the beam generated by the third driving current has a micro intensity.

8. A light sensing module, comprising:
   a light sensing device configured to receive a reflection light and accordingly generate a sensed light value, the sensed light value being related to an intensity of the reflection light, the reflection light being derived from a beam reflected by a standard test surface of a test device;
   a memory unit stored with a driving current value, the driving current value being related to the sensed light value; and
   a driving unit electrically connected to the memory unit and the light sensing device and configured to generate a driving current according to the driving current value thereby resulting in the sensed light value located in a standard region;
   wherein the light sensing device, the memory unit and the driving unit are packages as a whole.

9. The light sensing module according to claim 8, wherein the memory unit is a non-volatile memory.

10. The light sensing module according to claim 8, further comprising a light source configured to emit the beams according to driving current.

11. The light sensing module according to claim 10, wherein the light source and the light sensing device are disposed in two different accommodation spaces.

12. The light sensing module according to claim 11, wherein the accommodation space disposed with the light source is configured to have an opening with a size larger than that of the light source.

13. The light sensing module according to claim 10, wherein the light source and the light sensing device are disposed in a same accommodation space and configured to have a blocking part therebetween.

* * * * *